Feb. 9, 1965     A. R. NORDEN ETAL     3,168,856
CAMERA SHUTTERS

Filed April 11, 1961     2 Sheets-Sheet 1

INVENTORS
Alexander R. Norden
Paul S. Martin
BY

*Paul S. Martin*

ATTORNEY

Feb. 9, 1965  A. R. NORDEN ETAL  3,168,856
CAMERA SHUTTERS
Filed April 11, 1961  2 Sheets-Sheet 2
FIG. 2
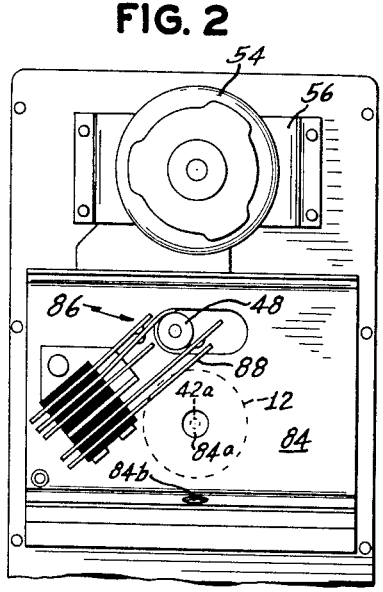
FIG. 3
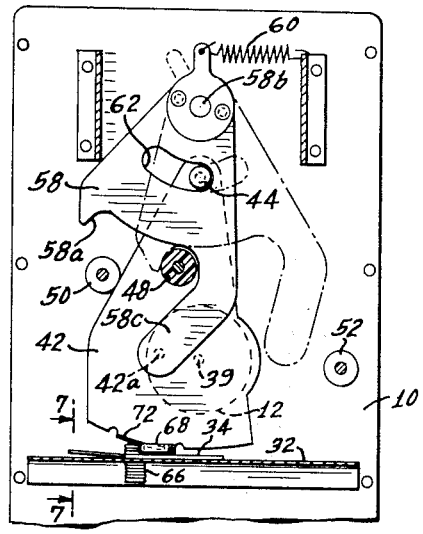
FIG. 5
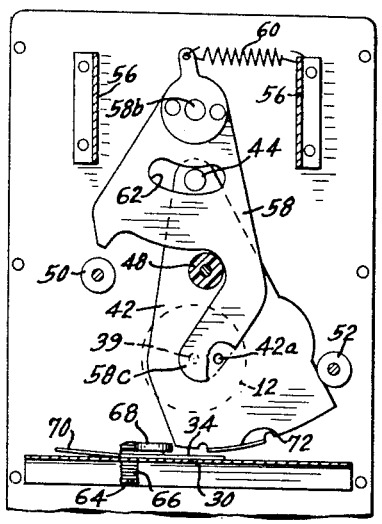
FIG. 4
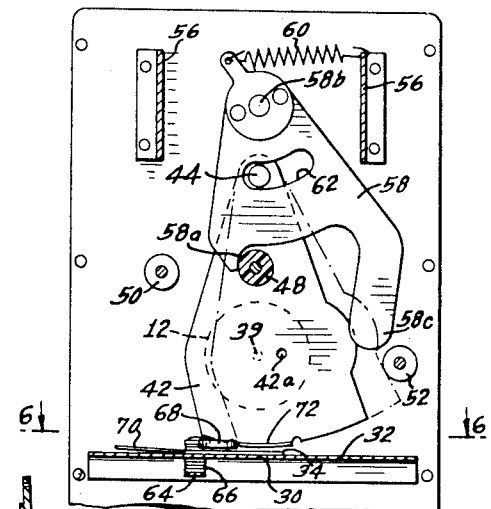
FIG. 6
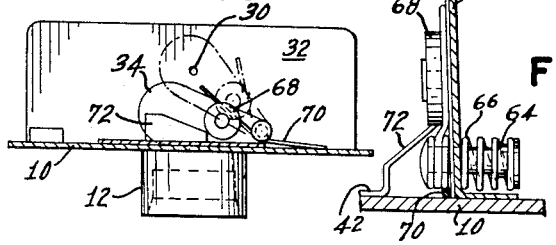
FIG. 7
INVENTORS
Alexander R. Norden
BY Paul S. Martin
Paul S. Martin
ATTORNEY

# United States Patent Office 3,168,856
Patented Feb. 9, 1965

3,168,856
CAMERA SHUTTERS
Alexander R. Norden, New York, and Paul S. Martin, Flushing, N.Y., assignors to American Foto Patrol Inc., a corporation of New York
Filed Apr. 11, 1961, Ser. No. 102,266
4 Claims. (Cl. 95—1.1)

The present invention relates to cameras and, more particularly, to cameras adapted to make two separate exposures concurrently.

The disclosed camera is adapted to register the image of a fast-moving object in a short-time exposure and to register the image of data related to the moving object in the same operation. While the camera is specially suitable for this purpose, it will be apparent that the novel concepts involved have more general application, the disclosed camera being exemplary but illustrative.

An object of the invention resides in the provision of a camera having respective "picture-taking" and "data-registering" optical systems related to produce images at closely adjacent areas of a common exposure frame, in which each optical system has its own shutter that is distinctively adapted to provide the exposure time appropriate to the respective exposures to be made. A feature of the invention is that separate shutters and different types of shutters are provided for each optical system. Each shutter is compatible with the space limitations of the optical systems and with the respective widely different exposure times that may be necessary for the two images. The illustrative mechanism detailed below involves an electromagnet and a return spring that constitute a common actuator for both shutters. One shutter includes a blade with a hole that moves into and out of line with a lens aperture to make a short-time exposure, and this shutter includes a capping blade for avoiding a second exposure during the return stroke of the apertured shutter blade. The second shutter involves a blade that is removed from the data aperture during the operation of the electromagnet, the exposure time being governed accordingly, and the second shutter being spring-returned.

The data optical system involves two mirrors, one mirror to insure projection of the data image immediately next to the "picture" of the other optical system and the other mirror to correct the "mirror image" that would result (compared to the directly projected "picture" image) were only one mirror employed. The "data" shutter is interposed between the two mirrors, and is in a plane transverse to the image plane at the film, while the "picture" shutter is parallel to the image plane.

In such an organization it is contemplated that the data shutter could be an upstanding integral projection of a "picture"-shutter blade, but since the picture shutter blades move in an arc, the data shutter blade would need complementary curved stationary members which involve certain manufacturing complications. The data shutter in the camera detailed below uses a separate shutter blade that works against a flat data aperture plate.

It is desirable that the "picture" shutter be actuated at high speed. A specific feature of the invention resides in the coordination of the data shutter to the picture shutter such that opening of the data shutter does not impede the operation of the "picture" shutter. This is achieved by a mechanical drive coupling from the picture shutter to the data shutter that closes the latter during the return stroke of the actuating mechanism. During the high-speed forward stroke of the "picture" shutter, the "data" shutter opens as a result of its own spring bias acting as the drive coupling (a cam and cam follower in this case) is withdrawn. The data shutter thus operates without impeding the "picture" shutter operation.

The nature of the invention, and its further objects and novel features will be more fully appreciated from the following detailed description of the illustrative embodiment of the invention shown in the accompanying drawings forming part of this disclosure. In the drawings:

FIG. 2 is a fragmentary view of the shutter mechanism, as viewed from the plane 2—2 in FIG. 1;

FIG. 3 is a view of the shutter mechanism, partly in section, as viewed from the plane 3—3 in FIG. 1;

FIGS. 4 and 5 are views similar to FIG. 3, showing the shutter parts in different phases of their operation;

FIG. 6 is a fragmentary elevation of the data-shutter mechanism, as viewed from the plane 6—6 of FIG. 4; and FIG. 7 is an enlarged cross-section at the plane 7—7 of FIG. 3.

Figure 1:
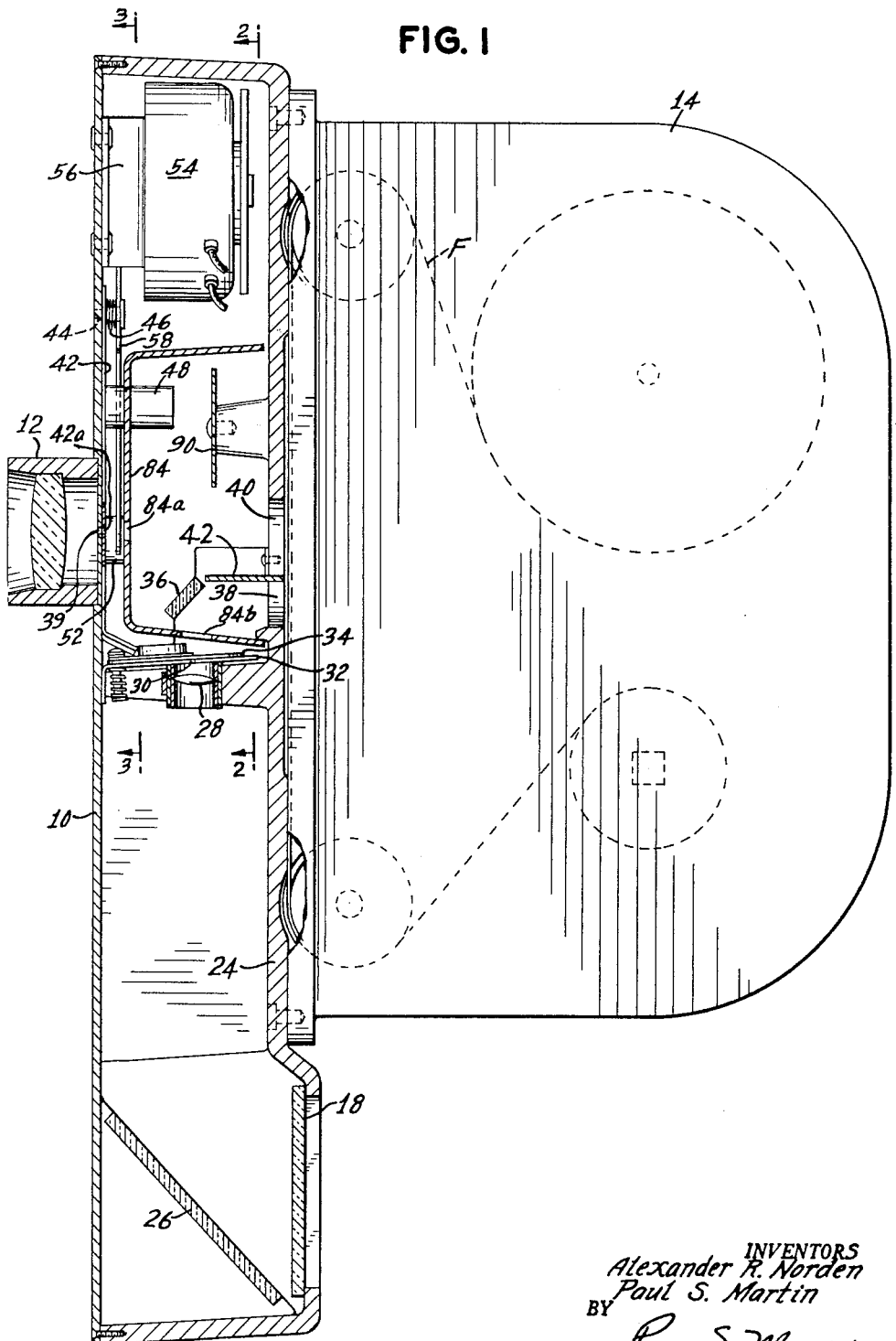
FIG. 1 is a side view of an illustrative embodiment of the invention, shown partly in cross-section.

Referring now to the drawings, the camera exterior involves a front plate 10 bearing a lens assembly 12 for photographing objects in front of the camera and normally at some distance away from the camera. Immediately behind front plate 10, and sealed in a light-tight front compartment, is a shutter mechanism. The rear section 14 of the camera contains the film-feeding mechanism and a film-chamber for supply and take-up rolls of film F. At the bottom of the camera and facing to the rear is a window 18 which is directed toward an external data-display area.

The camera body includes a dividing wall 24 which has side walls extending integrally to form a front compartment. The shutter mechanism and the optical systems are in front of this dividing wall and the film-feeding mechanism is behind this wall. The data image is admitted through window 18, and is reflected from front-surfaced mirror 26 to data lens 28. The data image passes through an aperture 30 in a wall 32 that is secured to front plate 10. The edges of wall 32 advantageously have soft gasketing material closing any edge-separation from front compartment wall 24 and the lateral side walls of the front compartment. Data shutter 34 normally blocks aperture 30, but when data shutter 34 moves away, the data image is reflected by front-surface mirror 36 through a data-image opening 38 to the film plane at the back surface of divider 24.

A "picture" is projected by lens assembly 12 through opening 39 in front-plate 10 and opening 40 in the wall 24 to reach a portion of the exposure area immediately adjacent to the data opening 38. Openings 38 and 40 are actually formed as a single frame, divided by a shield 42.

Two normally closed shutters block the light path from picture lens 12 and data lens 28 to the exposure frame. Aperture 39 in front plate 10 is normally blocked off by shutter blade 42. Shutter blade 42 has a fixed pivot 44 in the form of a fixed shouldered and headed rivet, and shutter blade 42 is biased against plate 10 at this pivot by a compression spring 46 surrounding this rivet. Rigidly fixed to shutter blade 42 is a stud in the form of a nylon sleeve 48. A pair of nylon bumpers 50 and 52 provide limit stops for the operating stroke of shutter blade 42.

A rotary solenoid 54 mounted on bracket 56 has its rotary armature rigidly connected to an actuating arm 58 that moves in a power stroke from the solid-line position represented in FIG. 3 to and slightly beyond the solid-line position represented in FIG. 4. Arm 58 and the rotary solenoid are operated through their return stroke by tension spring 60. Arm 58 has a clearance slot 62 for pivot 44 and spring 46 of the shutter blade 42.

During the initial part of its operating stroke, arm 58 moves idly, insofar as shutter 42 is concerned; but when portion 58a reaches shutter stud 48, the shutter blade is suddenly impelled at high speed. Because the radius of shutter part 48 about its pivot 44 is only about half the radius of actuating part 58a about its pivot 58b, the shutter blade is given an angular acceleration and brought up to twice the angular speed as the actuator 58. As a result, when hole 42a in shutter blade 42 crosses the aperture 39 in plate 10, the shutter "open" time is extremely brief. Actuator 58 has a capping-blade portion 58c; but this portion assumes the dotted-line position represented in FIG. 3 at the time that the forward motion of shutter blade 42 commences. Consequently, capping blade portion 58c does not interfere with the exposure.

As seen in FIG. 4, actuator 58 continues to drive shutter blade 42 until shutter-blade aperture 42a has traveled beyond the lens aperture 39.

Shutter blade 42 remains in the dotted-line position represented in FIG. 4 during the initial phase of the return motion of actuator 58. Shutter stud 48 is engaged by returning actuator 58 at a time when capping portion 58c has just come into line with opening 39. Thereafter, shutter hole 42a moves toward and across lens aperture 39 at approximately twice the angular speed of actuator 58. During this shutter motion, capping portion 58c blocks lens opening 39, avoiding a second exposure.

By virtue of the mechanism described, the shutter open time for lens 12 is extremely short. This is important in "stopping" motion of high-speed objects to be photographed. The taking of the data image, however, is quite different. It is desirable to use a small lens opening 30 and a long exposure time in recording data, both because the data is frequently available as a low-brightness subject, and because sharpness of focus is best obtained with a small aperture, particularly when a simple meniscus lens is used. Consequently, the data shutter open time should be relatively long. This is achieved in the present invention by actuating shutter blade 34 to uncover data aperture 30 during the forward stroke of shutter 42; and so long as the rotary solenoid 54 remains energized, the data shutter remains open. Upon return of the "picture" shutter 42 to its initial position, the data shutter is again closed.

For this purpose, data shutter 34 has an axially movable pivot 64 and is surrounded by a compression spring 66 that biases pivot 64 to the right in FIG. 7. Accordingly, spring 66 biases shutter blade 34 against stationary wall 32 in which aperture 30 is formed. Cam-following roller 68 is secured to shutter blade 34 by a rivet. Torsion spring 70 biases shutter blade 34 counterclockwise (FIG. 6). A cam 72 is formed as an integral upstanding portion of shutter blade 42 and cooperates with cam follower 68 so as to lift that cam follower and close data shutter 34 when the picture shutter 42 is in its normal closed condition as represented in FIG. 3. In this position, spring 70 (like spring 46 previously mentioned) biases shutter blade 42 against plate 10. When the picture shutter is shifted from its position in FIG. 3 to those in FIGS. 4 and 5, cam 72 is withdrawn from contact with cam follower 68, and spring 70 opens data shutter 34. It will be noted, accordingly, that the high-speed operation of the "picture" shutter 42 during its forward stroke when an exposure is being made is unimpeded by coupling of the picture shutter 42 to the data shutter 34. It is only during the return motion of the picture shutter 42 that cam 72 carried by the picture shutter engages cam follower 68 and raises shutter 34 against the relatively weak bias of its opening spring 70.

By the foregoing mechanism, a single solenoid is effective to operate two shutters, one of which has an extremely short open time and the other of which has as long an open time as may be desired.

A light baffle 84 with its apertures 84a and 84b provides further assurance that any limited light leakage past the shutters described will be absorbed. Baffle 84 is carried on front plate 10 by rivets passing through bumpers 50 and 52.

A set of contacts 86 is shown in FIG. 2, mounted on baffle 84 for coordinating the shutter and the film-feeding operations. Contacts 88 are provided for actuating an electric flash source of illumination (not shown). These sets of contacts are operated by nylon stud 48. By proper adjustment, contacts 88 can be arranged to close when the shutter hole 42a just starts to cross lens aperture 39. To guard against fogging of the film due to contact sparking, another baffle 90 is provided.

It will be appreciated that those skilled in the art will readily make various modifications and adaptations of this embodiment that utilize the novel features disclosed. Consequently, the invention should be broadly construed in a manner consistent with the spirit and scope of the invention.

This application is related to a concurrently filed application, Ser. No. 102,225, of Alexander R. Norden, entitled "Film Feeder," to which reference may be had for supplemental information as to the film-feeding mechanism and the correlation between the shutter mechanism and the film feeder.

What is claimed is:

1. A camera including a picture-taking optical system having a first shutter mechanism and a second optical system for projecting a data image adjacent to the image produced by said first optical system, said first shutter mechanism having a high-speed shutter and having reciprocating actuating means producing an exposure during its forward operating stroke, and a second shutter having a part engaged by a part of said first shutter mechanism and thereby held closed, said second shutter having an opening spring and being released for spring-opening in response to movement of the mechanism of said first shutter during said forward operating stroke, and being reclosed during the return stroke thereof.

2. A camera including a picture-taking optical system having a first shutter mechanism, a second optical system arranged to project a data image adjacent to the image of said picture-taking optical system, said first shutter mechanism including a high speed shutter operable in a plane substantially parallel to said images and said second optical system including two mirrors disposed to effect two substantially right-angle bends in the optical path, said second optical system including a lens between said mirrors and a second shutter disposed immediately adjacent to said lens and operable transverse to the axis thereof; and operable in a plane substantially perpendicular to the plane of said images, between said mirrors.

3. A camera in accordance with claim 2, wherein said second shutter is provided with a cam follower and cooperates with a reciprocable cam forming part of said first shutter to open and close during respective forward and return cam strokes.

4. A camera including first and second optical systems arranged to project side-by-side images at a film plane, said optical systems having first and second shutters, respectively, an electromagnet connected to said first shutter and arranged to produce a high-speed exposure stroke, and a spring arranged to operate said first shutter and said electromagnet in a return stroke, said second shutter having an opening spring and a cam follower, said first shutter including a shutter blade and a cooperating aperture plate and an upstanding cam portion operable against said cam follower to close said second shutter, the bias of said opening spring and said cam follower against said cam acting to press said shutter blade against said aperture plate.

References Cited in the file of this patent

UNITED STATES PATENTS

| | | |
|---|---|---|
| 621,332 | Esmond | Mar. 29, 1899 |
| 1,645,590 | Ernst | Oct. 18, 1927 |
| 2,042,983 | Fairchild | June 2, 1936 |
| 2,835,165 | Smith | May 20, 1958 |
| 2,859,674 | Rentschler | Nov. 11, 1958 |
| 2,860,558 | Roehrig | Nov. 18, 1958 |
| 2,896,522 | Stein | July 28, 1959 |